United States Patent
Liu et al.

(10) Patent No.: US 11,589,005 B1
(45) Date of Patent: Feb. 21, 2023

(54) METHOD AND SYSTEM FOR CONTROLLING SPEAKER TRACKING IN A VIDEO CONFERENCING SYSTEM

(71) Applicant: Plantronics, Inc., Santa Cruz, CA (US)

(72) Inventors: Yibo Liu, Boxborough, MA (US); Peter L. Chu, Lexington, MA (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 17/496,651

(22) Filed: Oct. 7, 2021

(51) Int. Cl.
*H04N 7/15* (2006.01)
*H04L 65/1083* (2022.01)
*G10L 25/78* (2013.01)
*H04L 65/403* (2022.01)

(52) U.S. Cl.
CPC ............. *H04N 7/15* (2013.01); *G10L 25/78* (2013.01); *H04L 65/1083* (2013.01); *H04L 65/403* (2013.01); *G10L 2025/783* (2013.01)

(58) Field of Classification Search
CPC ............ H04N 7/15; H04L 29/06; G10L 25/78
USPC ............................................. 348/14.01–14.16
See application file for complete search history.

(56) References Cited

U.S. PATENT DOCUMENTS

2014/0139615 A1* 5/2014 Graham .................. H04N 7/15 381/92
2019/0007623 A1* 1/2019 Wang .................. G06V 40/103

FOREIGN PATENT DOCUMENTS

WO    WO-2010106469 A1 * 9/2010 ............ G06F 3/162

OTHER PUBLICATIONS

Microsoft Docs: Loopback Recording—Win32 apps; Article published Jan. 6, 2021 (4 pages) <https://web.archive.org/web/20211021202304/https://docs.microsoft.com/en-us/windows/win32/coreaudio/loopback-recording>.
Teaching and Learning With Technology at Reed: Recording Your Mac's Video Screen with Audio; Retrieved from the Internet Jan. 20, 2021 (4 pages) <https://web.archive.org/web/20210120195937/https://blogs.reed.edu/ed-tech/recording-your-macs-video-screen-with-audio/>.
Debian Wiki: Audio Loopback Recording with PulseAudio; Last modified Oct. 31, 2015 (3 pages) available at: <https://wiki.debian.org/audio-loopback>.

* cited by examiner

*Primary Examiner* — Melur Ramakrishnaiah

(57) ABSTRACT

A video conferencing device for video conferencing between at least one local participant and a remote participant includes a video camera, a microphone array, and a speaker tracker. The video camera provides a local video input signal. The microphone array provides a local audio input signal. The speaker tracker is configured to identify a local speaker from the at least one local participant using a sound source localizer. The video conferencing device processes the local video input signal without the local speaker, based on the video conferencing device receiving a signal from a computing system, the signal dependent on a loopback audio output signal indicating that the remote participant is speaking.

19 Claims, 5 Drawing Sheets

METHOD AND SYSTEM FOR CONTROLLING SPEAKER TRACKING IN A VIDEO CONFERENCING SYSTEM

FIELD

The present disclosure relates generally to the field of video conferencing. More particularly, the present disclosure relates to controlling the tracking of a local speaker by a camera used for the video conferencing.

BACKGROUND

Video conferencing may be used to facilitate interaction between local participants and remote participants. Some video conferencing solution provide a speaker tracking feature. The speaker tracking feature identifies a currently speaking local speaker from among the local participants. Based at least in part on the identification of the local speaker, the local speaker may be highlighted in the video frames provided to the remote participants, for example, by identifying the local speaker using superimposed geometric shapes, etc., in the video frames. The highlighting may facilitate establishing visual contact and following the local speaker, by the remote participants.

SUMMARY

In general, in one aspect, one or more embodiments relate to a video conferencing device for video conferencing between at least one local participant and a remote participant, the video conferencing device comprising: a video camera providing a local video input signal; a microphone array providing a local audio input signal; a speaker tracker configured to identify a local speaker from the at least one local participant using a sound source localizer, wherein the video conferencing device processes the local video input signal without the local speaker, based on the video conferencing device receiving a signal from a computing system, the signal dependent on a loopback audio output signal indicating that the remote participant is speaking.

In general, in one aspect, one or more embodiments relate to a method for operating a video conferencing system, the method comprising: during a video conference between at least one local participant and a remote participant: receiving a local audio input signal from a microphone array of the video conferencing system and a local video input signal from a video camera of the video conferencing system; receiving a remote audio input signal from the remote participant; generating, from the remote audio input signal, a local audio output signal to drive a loudspeaker of the video conferencing system; generating a loopback audio output signal from the local audio output signal using an audio loopback interface; analyzing the loopback audio output signal for a speech signal; based at least in part on a detection of the speech signal, processing the local video input signal without a sound source localization configured to identify a local speaker from the at least one local participants.

In general, in one aspect, one or more embodiments relate to a method for operating a computing device of a video conferencing system, the method comprising, during a video conference between at least one local participant and a remote participant: receiving a remote audio input signal from the remote participant; generating, from the remote audio input signal, a local audio output signal; generating a loopback audio output signal from the local audio output signal using an audio loopback interface; depending on the loopback audio output signal, providing a signal to a video conferencing device, wherein the signal controls a sound source localization by the video conferencing device.

Other aspects of the invention will be apparent from the following description and the appended claims.

DETAILED DESCRIPTION

Figure 1:
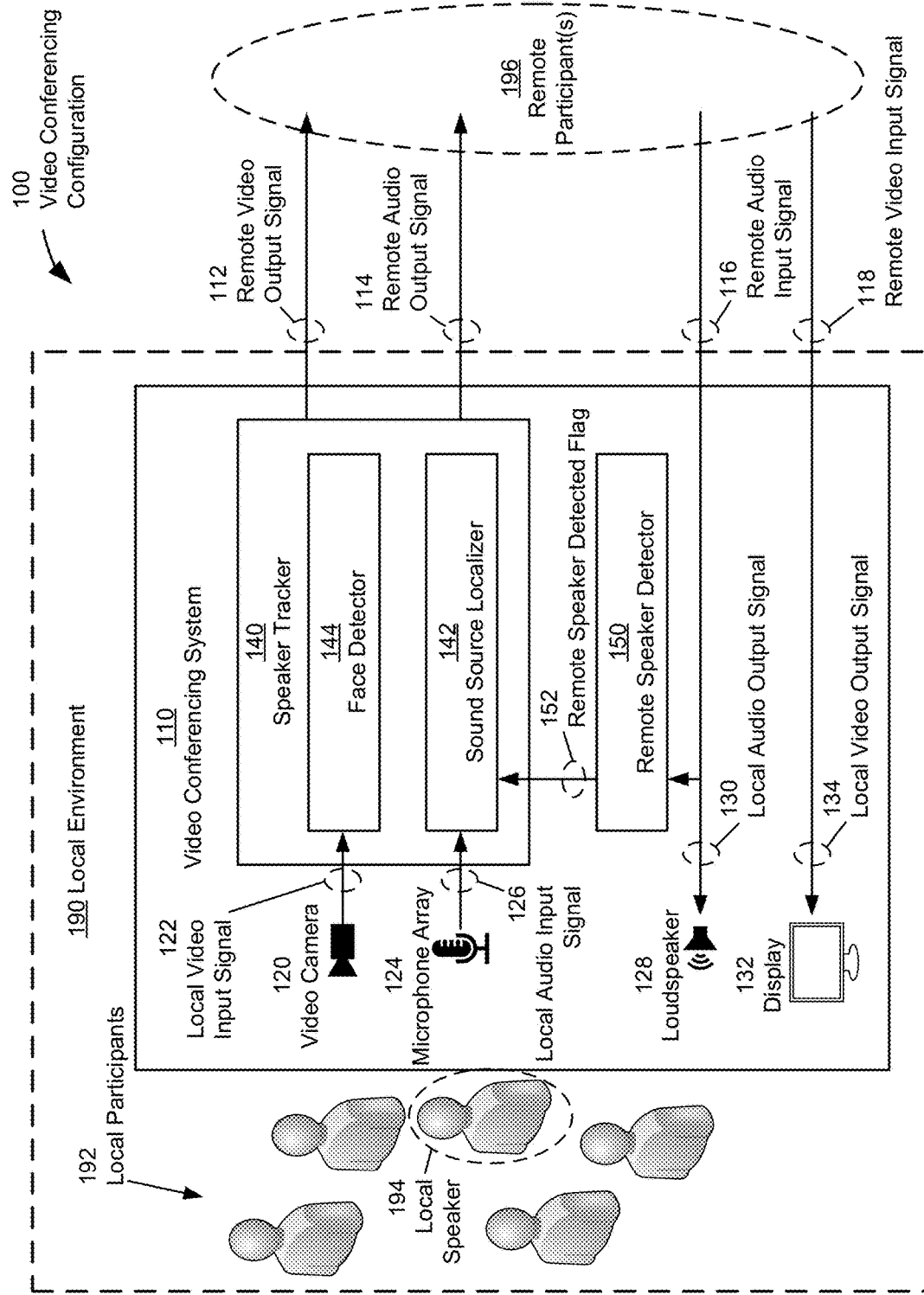
FIG. 1 shows a video conferencing configuration, in accordance with one or more embodiments of the disclosure.

Embodiments of the disclosure enable video conferencing between local participants in a local environment and remote participants that may be located elsewhere. In one or more embodiments, a video conferencing configuration provides a tracking of the local speaker (i.e., a tracking of the local participant that is currently speaking, in the local environment) to identify the local speaker from among the local participants. Under certain conditions, the tracking of the local speaker may be erroneous. In one or more embodiments, the tracking of the local speaker may be halted or altered when there is a risk that the tracking of the local speaker is erroneous. The cause for the erroneous tracking may be a speech signal emitted by a loudspeaker in the local environment, which may be wrongly attributed to a local speaker by the tracking of the local speaker, if not properly handled. One or more embodiments of the disclosure provide a local speaker tracking that avoids an erroneous tracking of the local speaker when a speech signal emitted by the loudspeaker. Embodiments of the disclosure may be used in conjunction with a variety of video conferencing configurations, including configurations with video conferencing software that does not support a remote speaker detection or that is not configured to provide a signal indicating the detection of a remote participant that is speaking. A detailed description is subsequently provided.

The tracking of the local speaker may be performed using methods that include sound source localization, e.g., using a microphone array disposed in the local environment. The sound source localization, in one or more embodiments, provides an identification of the local speaker by identifying the approximate origin of the speech signal in an audio signal captured by the microphone array as the local speaker is speaking. Based on the identified approximate origin of the speech signal, a tracking of the local speaker may be performed by mapping the approximate origin of the speech audio signal to one of the local participants, using image processing operations such as face detection.

In one or more embodiments, the video conferencing system includes a loudspeaker, disposed in the local environment and configured to provide an audio signal to the local participants. The audio signal may originate from the remote participants and may, thus, enable the local participants to hear the remote participants.

The sound source localization may indiscriminately operate on any speech signal, including a speech signal originating from a local speaker, and a speech signal originating from a remote speaker emitted by the loudspeaker, unless the sound source localization is selectively performed. Accordingly, an erroneous tracking of the local speaker may occur when the sound source localization operates on a speech signal associated with a remote participant emitted by the loudspeaker, because no proper mapping exists between the location of the loudspeaker (which would be identified by the sound source localization as the speech signal is emitted by the loudspeaker) and a local participant.

In order to prevent an erroneous tracking of a local speaker when a remote participant is speaking, in one or more embodiments, a remote speaker detection is performed to suppress or modify the tracking of the local speaker whenever a speech signal is detected on the audio signal received from the remote participant.

However, in some video conferencing systems, the speech signal associated with a remote participant may not be locally accessible. This may be the case, for example, in a video conferencing system that includes a video conferencing device and a separate computing system (e.g., a configuration including a video conferencing device that is equipped with a video camera and a microphone array, and a separate computing system (such as a desktop or laptop personal computer) driving the loudspeaker). In such a configuration, in order to control the tracking of the local speaker, the computing system may generate a remote speaker detected flag or other signal to communicate to the video conferencing device that a remote participant is speaking. The remote speaker detected flag may then be used to control the tracking of the local speaker by the video conferencing device. A detailed description is subsequently provided in reference to the figures.

Turning to FIG. 1, a video conferencing configuration (100), in accordance with one or more embodiments, is shown. The video conferencing configuration (100) includes a video conferencing system (110) that facilitates a video conference between one or more local participants (192) that are present in a local environment (190), and one or more remote participants (196) that are located elsewhere. The local environment (190) may be a conference room, a classroom, or any other environment used for a video conference. One or more of the local participants (192) may be local speakers (194). A local speaker (194) is a local participant (192) that is currently speaking.

In one or more embodiments, the video conferencing system (110) may communicate with one or more similar video conferencing systems installed at the far-end (not shown). The video conferencing system (110) may exchange various signals with the other video conferencing system(s). The exchanged signals may include a remote video output signal (112), a remote audio output signal (114), a remote audio input signal (116), and a remote video input signal (118). In combination, these signals (112, 114, 116, 118) enable a bi-directional audio and video communication.

In general, input signals are signals that are received for a processing, and output signals are generated by the processing. Remote input signals are received from remote participants. Local input signals are received from input components (e.g., a video camera or a microphone). Local output signals are used to drive a local component (e.g., a loudspeaker or a display). Remote output signals are output signals transmitted to a remote participant.

The remote video output signal (112) is a video signal that is transmitted by the video conferencing system (110). The remote video output signal (112) may be based on a local video input signal (122) captured by a video camera (120), as further discussed below. The local video input signal (122) may include video frames showing the local environment (190) or part of the local environment, and one or more of the local participants (192), as captured by the video camera (120). In one or more embodiments, in order to obtain the remote video output signal (112), the local video input signal (122) is processed. The processing may involve, for example, operations to highlight the local speaker, as discussed in detail below, and possibly other video processing operations. Accordingly, the remote video output signal (112), when displayed to the remote participants (196), may enable the remote participants (196) to see one or more of the local participants (192), including the local speaker (194) in the local environment (190).

The remote audio output signal (114) is an audio signal that is transmitted by the video conferencing system (110). The remote audio output signal (114) may be based on a local audio input signal (126) captured by a microphone array (124), as further discussed below. The local audio input signal (126) may include a speech signal associated with the local speaker (194) or multiple local speakers, as captured by the microphone array (124). The local audio input signal (126) may further include other audio signals such as ambient noise. In order to obtain the remote audio output signal (114), the local audio input signal (126) may be processed. The processing may involve for example, operations to eliminate or reduce ambient noise, amplify the voice signal associated with the local speaker (194), and possibly other audio processing operations. Accordingly, the remote audio output signal (114), when provided to the remote participants (196), may enable the remote participants (196) to hear audio signals originating from the local environment (190), including the voice signal associated with the local speaker (194).

The remote audio input signal (116) is an audio signal that is received by the video conferencing system (110). The remote audio input signal (116) may include audio signals from the remote participants (196), including a speaker signal when a remote participant is speaking. The remote audio input signal (116) may undergo processing to generate a local audio output signal (130) for driving the loudspeaker (128). The processing may involve for example, operations to eliminate or reduce ambient noise and possibly other audio processing operations. Accordingly, the remote audio input signal (116), when converted to the local audio output signal (130) and outputted by the loudspeaker (128), may enable the local participants (192) to hear audio signals originating from the remote participants (196).

The remote video input signal (118) is a video signal that is received by the video conferencing system (110). The remote video input signal (118) may include video signals from the remote participants (196), e.g., including a view of one or more of the remote participants (196). The remote video input signal (118) may undergo processing to generate a local video output signal (134) for driving the display (132). The processing may involve for example, operations to combine the remote video signal associated with one remote participant with remote video signals associated with remote participants, the local video input signal (122), etc., to compose a combined view that includes views of multiple participants (remote and local) for presentation to the local participants on the display (132).

Turning to the video conferencing system (110), the video conferencing system (110) may include various components, including, but not limited to, a video camera (120), a microphone array (124), a loudspeaker (128), a display (132), a speaker tracker (140), and a remote speaker detector (150). Each of these components is subsequently described. The components may be arranged in different manners, as discussed in reference to FIGS. 2 and 3.

The video camera (120), in one or more embodiments, is configured to capture images or video, e.g., in a video conference scenario. The video camera (120) may be oriented such that the video camera may obtain a full or partial view of the local environment (190) including one or more of the local participants (192). The video camera (120) may be a CCD-type, CMOS-type or any other type of video camera, with any resolution and any frame rate. The video camera (120) provides a local video input signal (122) which may undergo video processing operations (not shown) such as image quality enhancing operations (contrast, brightness and color adjustments, image cropping, etc.). The local video input signal (122), after the video processing may be provided to the remote participants (196) in the form of a remote video output signal (112).

The video camera (120) may include additional functionality. For example, the video camera (120) may be able to zoom, pan, or both, either digitally, optically, or digitally and optically.

In one or more embodiments, the local video input signal (122) is an input to the speaker tracker (140), where the local video input signal (122) may be used for the purpose of tracking the local speaker (194), as further discussed below.

The microphone array (124), in one or more embodiments, is configured to capture audio in the local environment (190), e.g., during a video conference call. The microphone array (124) may include multiple microphones to capture directional audio, to enable localization of the local speaker (194) and/or to facilitate speaker localization, noise suppression, etc. The multiple microphones may be spatially distributed, e.g., across the local environment (190) or within a housing of the video conferencing system (110). The microphone array (124) provides a local audio input signal (126) which may undergo audio processing operations (not shown) such as amplification, filtering, noise suppression, muting, etc. The local audio input signal (126), after the audio processing, may be provided to the remote participants (196) in the form of a remote audio output signal (114).

In one or more embodiments, the local audio input signal (126) is an input to the speaker tracker (140), where the local audio input signal (126) may be used for the purpose of tracking the local speaker (194), as further discussed below.

The loudspeaker (128), in one or more embodiments, is configured to output audio to the local environment (190), e.g., during a video conference call. The loudspeaker (128) may be a single loudspeaker or may include multiple loudspeakers, e.g., distributed in the local environment (190). The loudspeaker (128) may emit audio based on a local audio output signal (130). The local audio output signal (130) may be generated by processing a remote audio input signal (116). The processing may include, for example, equalizing and volume controlling the remote audio input signal (116).

The display (132), in one or more embodiments, is configured to output video to the local environment (190), e.g., during a video conference call. The display (132) may be a computer monitor, a television, or any other type of display or combination of displays. The display (132) may display video content based on a local video output signal (134). The local video output signal may be generated by processing a remote video input signal (118). The processing may include, for example, the combination of content obtained from multiple remote video input signals, to support scenarios with multiple remote participants. In such a scenario, the display (132) may display multiple or all of the remote participants (196). Additional video processing operations may be performed.

The speaker tracker (140), in one or more embodiments, is configured to track the local speaker (194). The tracking of the local speaker (194) may involve identifying (e.g., highlighting) the local speaker in the remote video output signal (112), once the local speaker (194) has been identified from among the local participants (192). The operations performed by the speaker tracker (140) are subsequently described and may be implemented by instructions executed by a computer processor similar to the computer processor described in reference to FIG. 5. The speaker tracker, in one or more embodiments, includes a sound source localizer (142) and a face detector (144).

The sound source localizer (142) in one or more embodiments, is configured to perform a sound source localization. The sound source localization may involve a speech signal detection and a localization of the sound source from where the speech signal originates. The speech signal detection and the localization of the sound source may be performed based on the local audio input signal (126) obtained from the microphone array (124).

The speech signal detection may involve identifying audio energy in frequency bands that are typical for speech, e.g., in the range between 400 Hz and 7200 Hz. When the audio energy in the frequency bands exceeds a predetermined threshold, the speech signal detection may conclude that speech is present on the local audio input signal (126). The determination may be made under consideration of a noise floor, i.e., the predetermined threshold may be adjusted, based on the detected noise floor. Other methods for speech signal detection may be used, without departing from the disclosure.

When a speech signal is detected, the localization of the sound source associated with the speech signal on the local audio input signal (126) may be performed. The localization may be based on measurements of the time difference of arrival at the microphones of the microphone array (124). Any method for localizing the sound source may be used, without departing from the disclosure. The output of the sound source localization may be an approximate spatial location in the local environment (190).

In one or more embodiments, the sound source localization may be paused. The sound source localization may be paused when the sound source localizer (142) receives a remote speaker detected flag (152), to avoid an erroneous tracking of the local speaker (194) when a remote participant (196) is speaking. A detailed description is provided below.

The face detector (144), in one or more embodiments, uses methods of image processing to locate the local participants (192) in the local environment (190) by processing the local video input signal (122) obtained from the video camera (120). Any type of algorithm, e.g., a genetic algorithm, an artificial neural network algorithm, etc. may be used to perform the face detection.

Based on the sound source localization performed by the sound source localizer (142) and the face detection performed by the face detector (144), the speaker tracking may map the spatial location of the sound source onto the closest detected face. The closest detected face is then identified as the local speaker (194). The speaker tracker (140) may perform operations to identify the identified local speaker. The identification of the local speaker may be included in the remote video output signal (112) to increase the visibility of the local speaker (194) for the remote participants (196). The identification may be performed by zooming into the speaker, adding a geometric shape, such as a rectangle surrounding the local speaker (194), an arrow pointing at the local speaker (194), a color coding of the local speaker, etc. Any method for identifying the local speaker may be used, without departing from the disclosure.

The remote speaker detector (150), in one or more embodiments, is configured to detect a speech signal on the local audio output signal (130), used for driving the loudspeaker (128). A speech signal on the local audio output signal (130) would necessarily be associated with a remote speaker, i.e., one of the remote participants (196). An attempt to perform a speaker tracking by the speaker tracker (140) based on the speech signal associated with the remote speaker would fail because no local participant can be identified or would be wrongly identified based on the speech signal emitted by the loudspeaker (128).

To avoid such an erroneous speaker tracking, the remote speaker detector (150), in one or more embodiments, provides a signal, e.g., a remote speaker detected flag (152) to the speaker tracker (140), when the remote speaker detector (150) detects a speech signal on the local audio output signal (130). The speech signal detection by the remote speaker detector may involve identifying audio energy in frequency bands that are typical for speech, e.g., in the range between 400 Hz and 7200 Hz. When the audio energy in the frequency bands exceeds a predetermined threshold, the speech signal detection may conclude that speech is present. The determination may be made under consideration of a noise floor, i.e., the predetermined threshold may be adjusted, based on the detected noise floor. Other methods for speech signal detection may be used, without departing from the disclosure. The operations performed by the remote speaker detector (150) may be implemented by instructions executed by a computer processor similar to the computer processor described in reference to FIG. 5.

While FIG. 1 provides an overview of the video conferencing configuration (100), a more detailed description of possible implementations is subsequently provided in reference to FIGS. 2 and 3.

Figure 2:
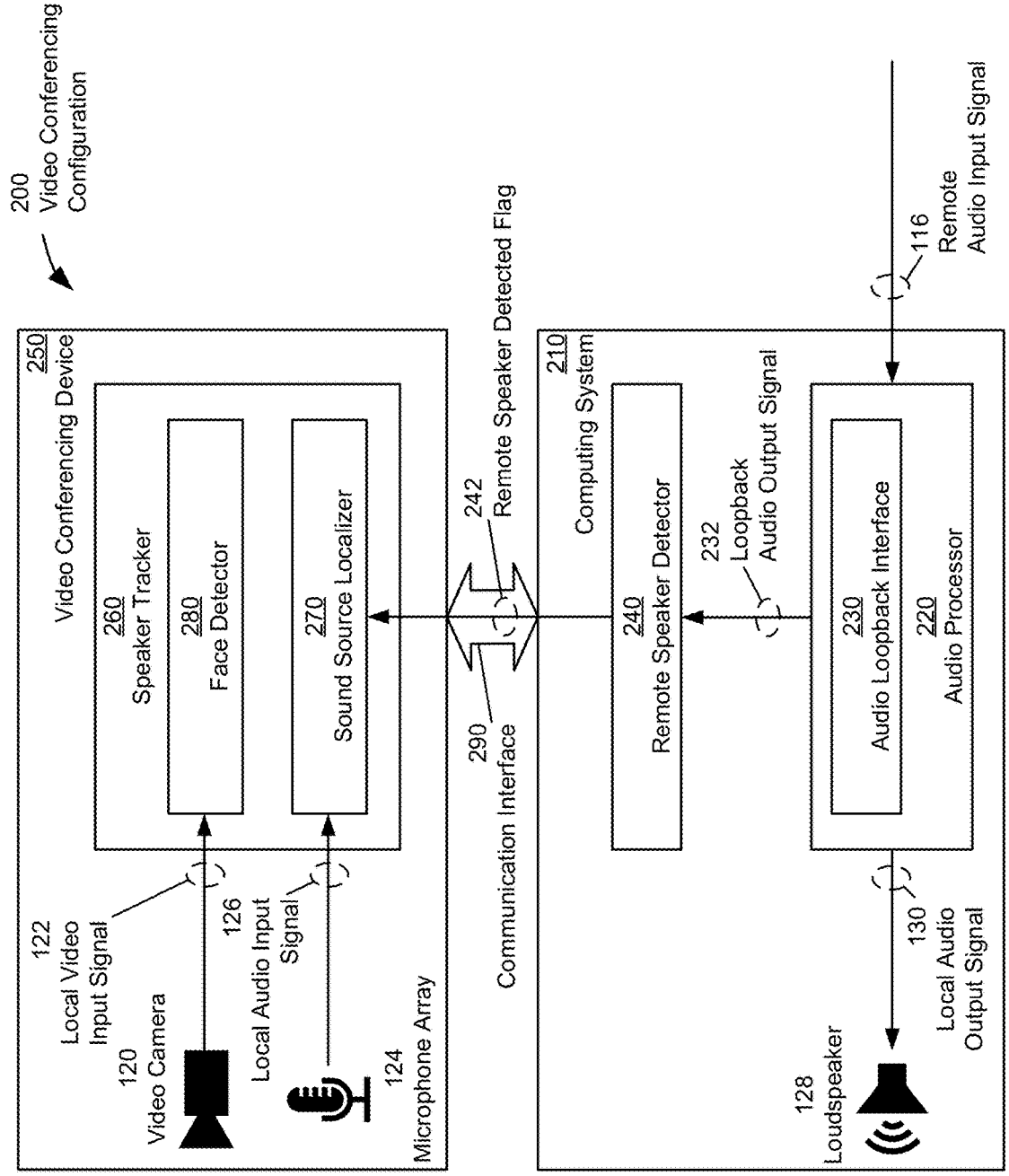
FIG. 2 shows a video conferencing configuration, in accordance with one or more embodiments of the disclosure.

Turning to FIG. 2, a video conferencing configuration (200), in accordance with one or more embodiments, is shown. The video conferencing configuration (200) includes a computing system (210) and a video conferencing device (250). The video conferencing device (250) may be an input device equipped with a video camera (120) providing a local video input signal (122) and a microphone array (126) providing a local audio input signal (126). These components and signals may be as described in FIG. 1. The input device may not include a loudspeaker. The computing system (210) may be a personal computer, a laptop, or any other type of computing device that may interface with the video conferencing device (250), e.g., via a communication interface (290) such as a USB, Wi-Fi, Bluetooth, Ethernet, or any other communication interface. The communication interface includes a set of hardware or software components on the video conferencing device and a set of hardware or software components on the computing system to perform the communication. The computing system (210) may be a computing system as described in reference to FIG. 5. In one or more embodiments, the computing system includes a loudspeaker (128) driven by the local audio output signal (130). The audio output signal (130) may be generated by processing the remote audio input signal (116) by the audio processor (220) as subsequently described. In one or more embodiments, the remote audio input signal (116) is not shared with the video conferencing device (250) by the computing system (210). Accordingly, the remote audio input signal (116) is inaccessible by the video conferencing device (250).

In one or more embodiments, the audio processor performs operations on the remote audio input signal (116) in order to generate the local audio output signal (130). The operations may include amplification, filtering, equalization, possibly mixing with other input signals and any other possible audio processing operations. In one or more embodiments, the audio processor (220) includes an audio loopback interface (230). The audio loopback interface (230), in one or more embodiments, is configured to capture the local audio output signal (130) in the form of the loopback audio output signal (232). In other words, the loopback audio output signal (232) may be a copy of the local audio output signal (130) provided to the loudspeaker (128). Because the local audio output signal (130) is based on the remote audio input signal (116), a speech signal from the remote may be detectable on the loopback audio output signal (232). In one or more embodiments, the audio loopback interface (230) is provided by the operating system of the computing system, for example by a Windows API (Windows Audio Session API (WASAPI)), or a macOS or Linux add-on (audio routing add-on providing a virtual loopback audio device). Accordingly, the availability of the loopback audio output signal (232) may be independent from any video conferencing software executing on the computing system (210). Even if the video conferencing software uses proprietary, encrypted or otherwise inaccessible methods for communicating audio signals with a corresponding video conferencing software at the remote end, a speech signal from the remote end is made accessible via the audio loopback interface (230). The audio-loopback interface (230) may be implemented as an automatically starting service (Windows) or daemon (Linux). Alternatively, the audio-loopback interface (230) may be started by a user, e.g., through a software application.

In one or more embodiments, the loopback audio output signal (232) is provided to the remote speaker detector (240). The remote speaker detector (240) may operate as previously described in reference to FIG. 1, to determine whether speech is present on the loopback audio output signal. As previously described, the remote speaker detector (240) emits a remote speaker detected flag, if speech is found to be present on the loopback audio output signal (242). The remote speaker detected flag (242) may be communicated to the sound source localizer (270) of the video conferencing device (250) using the communication interface (290) between the computing system (210) and the video conferencing device (250).

Figure 3:
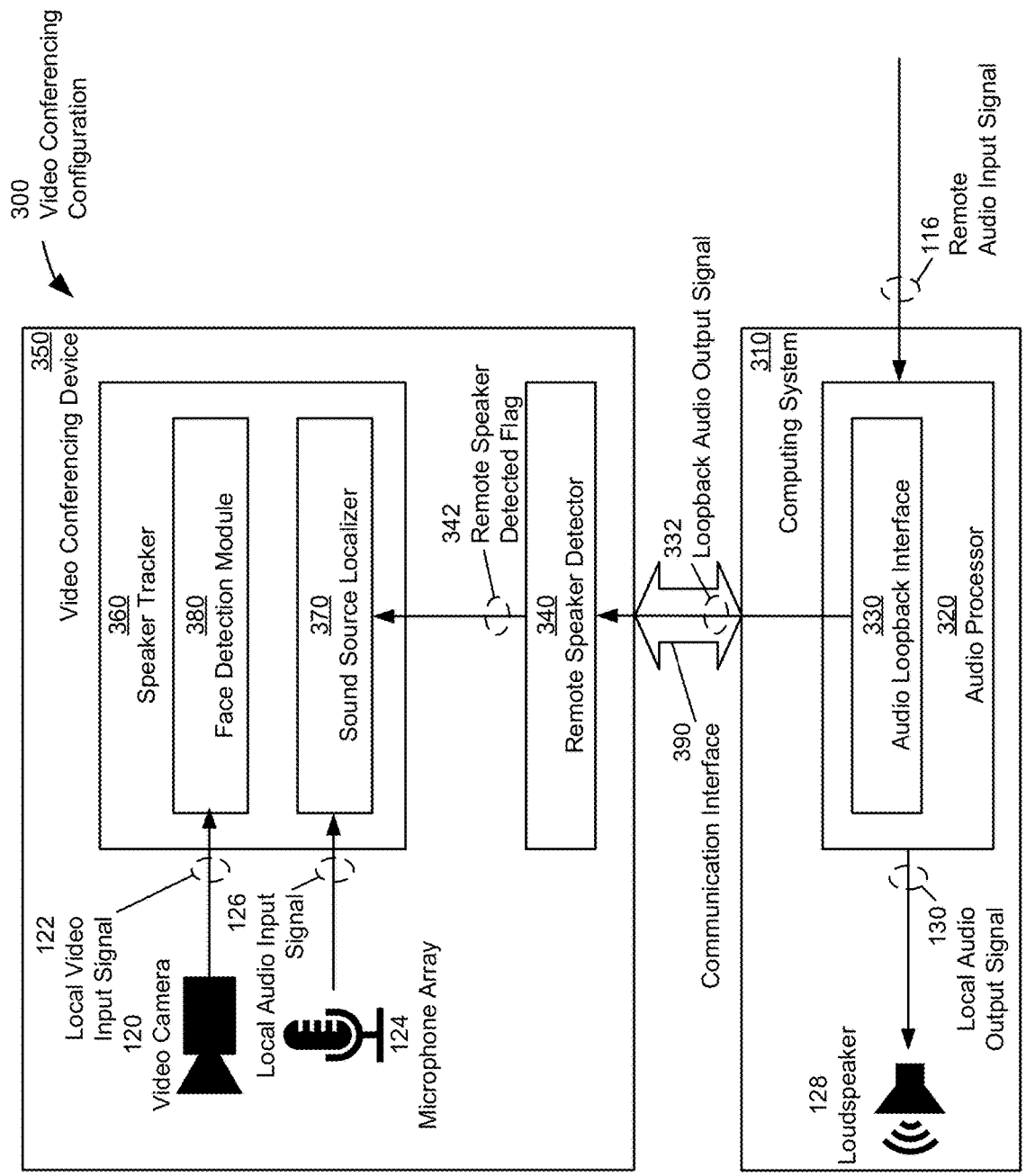
FIG. 3 shows video conferencing configuration, in accordance with one or more embodiments of the disclosure.

Turning to FIG. 3, a video conferencing configuration (300), in accordance with one or more embodiments, is shown. The video conferencing configuration (300) includes a computing system (310) and a video conferencing device (350). The video conferencing device (350) may be an input device equipped with a video camera (120) providing a local video input signal (122) and a microphone array (126) providing a local audio input signal (126). These components and signals may be as described in FIG. 1. The input device may not include output components such as a loudspeaker. The computing system (310) may be a personal computer, a laptop, or any other type of computing device that may interface with the video conferencing device (350), e.g., via a communication interface (390) such as a USB, Wi-Fi, Bluetooth, Ethernet, or any other communication interface. The computing system (310) may be a computing system as described in reference to FIG. 5. In one or more embodiments, the computing system (310) includes a loudspeaker (128) driven by the local audio output signal (130). The audio output signal (130) may be generated by processing the remote audio input signal (116) by the audio processor (320) as subsequently described.

In various aspects, the video conferencing configuration (300) is similar to the video conferencing configuration (200). The audio processor (320) including the audio loopback interface (330), and the speaker tracker (360) including the sound localizer (370) and the face detector (380) are similar to the corresponding components of the video conferencing configuration (200). However, unlike in the video conferencing configuration (200), in the video conferencing configuration (300), the remote speaker detector (340) is a component of the video conferencing device (350). The remote speaker detector (340) receives the loopback audio output signal (332) via the communication interface (390) between the computing system (310) and the video conferencing device (350), while the remote audio input signal (116) remains inaccessible by the video conferencing device (350). The remote speaker detector (340) may otherwise operate analogous to the remote speaker detector (240) of the video conferencing configuration (200).

FIGS. 2 and 3 show components that are related to controlling the tracking of a local speaker. The video conferencing configurations (200, 300) may include other components, without departing from the disclosure.

Figure 4:
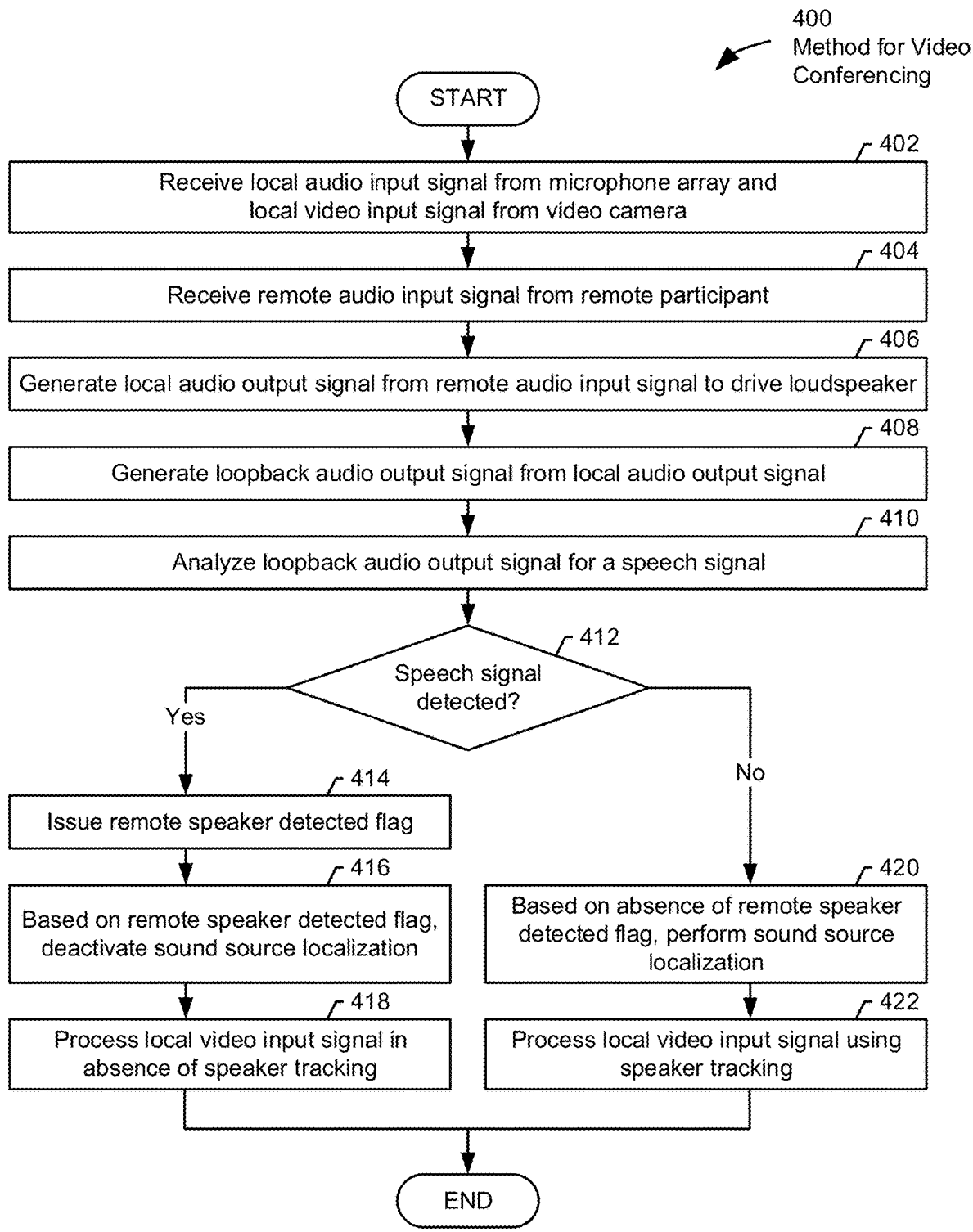
FIG. 4 shows a flowchart, in accordance with one or more embodiments of the disclosure.

FIG. 4 shows a flowchart in accordance with one or more embodiments. The flowchart of FIG. 4 depicts a method (400) for controlling speaker tracking in a video conferencing system. One or more of the operations in FIG. 4 may be performed by various components of the systems, previously described in reference to FIGS. 1, 2, and 3. The operations may be performed during an ongoing video conference between at least one local participant and at least one remote participant who use the video conferencing system for the video conference.

In operation 402, in one or more embodiments, a local audio input signal is received from a microphone array and a local video input signal is received from a video camera. The microphone array and the video camera may be components of a video conferencing device that is part of the video conferencing system.

In operation 404, in one or more embodiments, a remote audio input signal is received from the remote participant. The remote audio input signal may or may not contain a speech signal, depending on, for example, whether the remote participant is speaking. The remote audio input signal may be received by a computing system that is separate from the video conferencing device.

In operation 406, in one or more embodiments, a local audio output signal is generated from the remote audio input signal to drive a loudspeaker. Various signal processing operations may be performed, as previously described. The remote audio input signal may, thus, be audible to the local participant(s).

In operation 408, in one or more embodiments, a loopback audio output signal is generated from the local audio output signal. The loopback audio output signal may be generated by the computing system, e.g., by components of the operating system of the computing system, as previously described.

In operation 410, in one or more embodiments, the loopback audio output signal is analyzed for a speech signal. In other words, a test is performed to determine whether a speech signal is present. The test may be performed by a remote speaker detector that may be executed on either the computing system or on the video conferencing device. The remote speaker detector may perform various operations, as previously described.

In operation 412, in one or more embodiments, depending on whether or not a speech signal is detected, the method may proceed with different operations. If a speech signal is detected, the execution of the method proceeds with operation 414.

In operation 414, in one or more embodiments, a remote speaker detected flag, or any other type of signal indicating that a speech signal was detected on the loopback audio output signal, is issued.

In operation 416, in one or more embodiments, based on the remote speaker detected flag, the sound source localization, performed by the video conferencing device, is deactivated. Erroneous detection of a local speaker as result of the speech signal associated with a remote participant is, thus, avoided.

In operation 418, in one or more embodiments, the local video input signal is processed in absence of the sound source localization. Accordingly, no highlighting of a local speaker is performed, in the local video input signal.

In operation 420, which may be executed when no speech signal was detected on the loopback audio output signal, a sound source localization is performed, in one or more embodiments. The sound source localization may identify an approximate location of the origin of the speech signal, in the local environment. Using additional operations, e.g., face detection performed on the local video input signal, the speech signal may be mapped to one of the local participants, thereby identifying the local speaker.

In operation 422, in one or more embodiments, the local video input signal is processed to generate a remote video output signal. The processing may involve highlighting the local speaker, as previously described.

Figure 5:
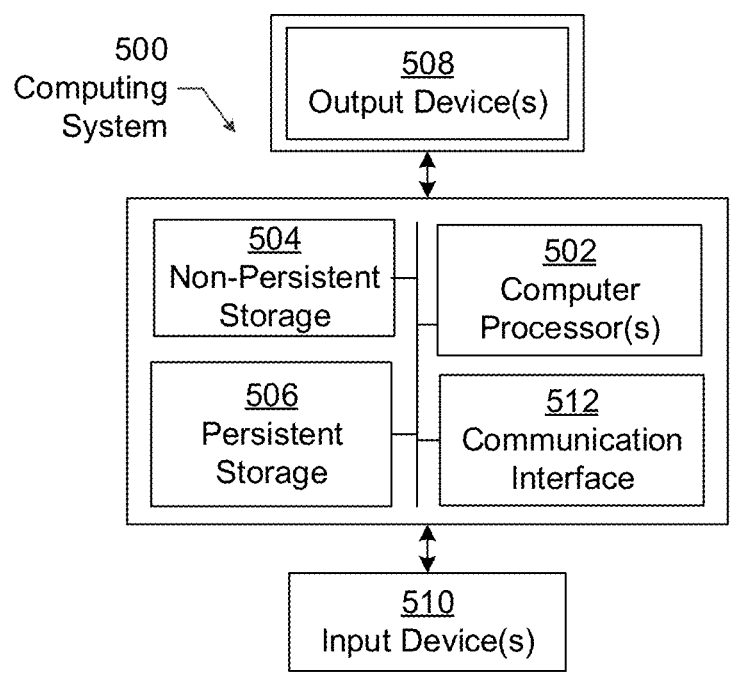
FIG. 5 shows a computing system, in accordance with one or more embodiments of the disclosure.

Embodiments of the disclosure may be implemented on a computing system. Any combination of mobile, desktop, server, embedded device, or other types of hardware may be used. For example, as shown in FIG. 5, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The above description of functions presents only a few examples of functions performed by the computing system of FIG. 5. Other functions may be performed using one or more embodiments of the disclosure.

In the detailed description of embodiments of the disclosure, numerous specific details have been set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may have been used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

Also, while the flowchart associated with the detailed description includes various operations that are presented and described sequentially, one of ordinary skill will appreciate that some or all of the operations may be executed in different orders, may be combined or omitted, and some or all of the operations may be executed in parallel. Additional operations may further be performed. Furthermore, the operations may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure. Accordingly, the scope of the disclosure should not be considered limited to the specific arrangement of operations shown in the flowchart.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A video conferencing device (250, 350) for video conferencing between at least one local participant (192) and a remote participant (196), the video conferencing device comprising:
   a video camera (120) providing a local video input signal (122);
   a microphone array (124) providing a local audio input signal (126),
   wherein the video conference device (250,350) excludes a loudspeaker (128) of a computing system (210) that outputs audio based on a remote audio input signal (116); and
   a speaker tracker (260, 360) configured to identify a local speaker (194) from the at least one local participant using a sound source localizer (270),
   wherein the video conferencing device processes the local video input signal without audio from the loudspeaker (128), based on the video conferencing device receiving a signal from the computing system (210), the signal dependent on a loopback audio output signal (332) indicating that the remote participant is speaking,
   wherein the loopback audio output signal (332) comprises a copy of a local output audio signal (130) provided to the loudspeaker (128) of the computing system (210).

2. The video conferencing device of claim 1, wherein, based at least in part on an absence of the signal from the computing system:
   the video conferencing device activates the sound source localizer,
   the speaker tracker identifies the local speaker for the at least one local participant, and
   the video conferencing device processes the local video input signal using the local speaker.

3. The video conferencing device of claim 2, wherein the video conferencing device processes the local video input signal using the local speaker by performing operations comprising:
   generating a remote video output signal (112), based at least in part on the local video input signal, and
   identifying the local speaker, in the remote video output signal.

4. The video conferencing device of claim 1, wherein the signal from the computing system is a remote speaker detected flag (242), generated by the computing system.

5. The video conferencing device of claim 1, further comprising:
   a communication interface for receiving the loopback audio output signal (332) generated by the computing system as the signal from the computing system, and
   a remote speaker detector (340) configured to:
      analyze the loopback audio output signal for a speech signal, and
      based at least in part on a detection of the speech signal, provide a remote speaker detected flag (342) to the sound source localizer to cause deactivation of the sound source localizer.

6. The video conferencing device of claim 1, further comprising:
   a remote speaker detector (340) configured to:

compare a signal energy of the loopback audio output signal against a predetermined threshold, in a speech frequency band.

7. A method for operating a video conferencing system, the method comprising:
during a video conference between at least one local participant (192) and a remote participant (196), wherein the video conferencing system excludes a loudspeaker (128) of a computing system (210) that outputs audio based on a remote audio input signal (116) received from a remote device of the remote participant:
receiving (402) a local audio input signal from a microphone array of the video conferencing system and a local video input signal from a video camera of the video conferencing system;
receiving (404) a remote audio input signal from the remote participant;
generating (406), from the remote audio input signal, a local audio output signal to drive the loudspeaker of the video conferencing system;
generating (408) a loopback audio output signal from the local audio output signal using an audio loopback interface, wherein the loopback audio output signal (332) comprises a copy of a local output audio signal (130) provided to the loudspeaker (128) of the computing system (210);
analyzing (410) the loopback audio output signal for a speech signal;
based at least in part on a detection of the loopback audio output signal, processing (418) the local video input signal without audio from the loudspeaker.

8. The method of claim 7, wherein the processing the local video input signal comprises:
generating a remote video output signal, based at least in part on the local video input signal; and
identifying a local speaker, in the remote video output signal.

9. The method of claim 7,
wherein the generating the loopback audio output signal from the local audio output signal is performed by a computing system,
wherein the computing system comprises the audio loopback interface,
wherein the computing system is separate from a video conferencing device, and interfacing with the video conferencing device using a communication interface,
wherein the video conferencing device comprises the video camera and the microphone array, and
wherein the remote audio input signal is inaccessible by the video conferencing device.

10. The method of claim 9, further comprising:
generating, by the computing system, a remote speaker-detected flag, and
deactivating a sound source localization based at least in part on the remote speaker-detected flag.

11. The method of claim 9, further comprising:
providing, by the computing system, the loopback audio output signal to the video conferencing device;
wherein the video conferencing device is configured to:
perform the analyzing the loopback audio output signal for the speech signal;
perform deactivating of the sound source localization based at least in part on the detection of the speech signal on the loopback audio output signal.

12. The method of claim 9, wherein the audio loopback interface is provided by an operating system of the computing system.

13. The method of claim 7, wherein analyzing the loopback audio output signal for the speech signal comprises:
comparing a signal energy of the loopback audio output signal against a predetermined threshold, in a speech frequency band.

14. A method for operating a computing device (210, 310) of a video conferencing system (110), the method comprising, during a video conference between at least one local participant (192) and a remote participant (196), wherein the video conferencing system (110) excludes a loudspeaker (128) of a computing device (210, 310) that outputs audio based on a remote audio input signal (116) received from a remote device of the remote participant:
receiving (404) a remote audio input signal (116) from the remote participant;
generating (406), from the remote audio input signal, a local audio output signal;
generating (408) a loopback audio output signal (232, 332) from the local audio output signal (130) using an audio loopback interface (230, 330), wherein the loopback audio output signal (332) comprises a copy of the local output audio signal (130) provided to the loudspeaker (128) of the computing device (210, 310);
depending on the loopback audio output signal (232), providing a signal (242, 332) to the video conferencing system (110), wherein the signal controls a sound source localization by the video conferencing system (110) without audio from the loudspeaker (128).

15. The method of claim 14, further comprising:
analyzing (410) the loopback audio output signal for a speech signal.

16. The method of claim 15, further comprising:
based at least in part on a detection of the speech signal, (412-416), providing a remote speaker detected flag (242) to the video conferencing system.

17. The method of claim 14, further comprising: wherein analyzing the loopback audio output signal for the speech signal comprises:
comparing a signal energy of the loopback audio output signal against a predetermined threshold, in a speech frequency band.

18. The method of claim 14, wherein the audio loopback interface is provided by an operating system of the computing device (210, 310).

19. The method of claim 14, further comprising:
driving a loudspeaker (128) of the computing device, using the local audio output signal.

* * * * *